(12) United States Patent
Jestin et al.

(10) Patent No.: US 9,776,529 B2
(45) Date of Patent: Oct. 3, 2017

(54) METHOD AND DEVICE FOR MANAGING ELECTRICAL ENERGY STORAGE ASSEMBLIES FOR ELECTRICAL POWER SUPPLY OF AN ELECTRIC MOTOR VEHICLE

(71) Applicant: BLUE SOLUTIONS, Ergue Gaberic (FR)

(72) Inventors: Jean-Jacques Jestin, Fouesnant (FR); Jacques Colin, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 277 days.

(21) Appl. No.: 14/426,980

(22) PCT Filed: Sep. 10, 2013

(86) PCT No.: PCT/EP2013/068654
§ 371 (c)(1),
(2) Date: Mar. 9, 2015

(87) PCT Pub. No.: WO2014/037572
PCT Pub. Date: Mar. 13, 2014

(65) Prior Publication Data
US 2015/0239366 A1    Aug. 27, 2015

(30) Foreign Application Priority Data

Sep. 10, 2012 (FR) ...................................... 12 58461

(51) Int. Cl.
*B60L 1/00* (2006.01)
*B60L 15/38* (2006.01)
(Continued)

(52) U.S. Cl.
CPC ............. *B60L 15/38* (2013.01); *B60L 3/0046* (2013.01); *B60L 3/04* (2013.01); *B60L 11/1803* (2013.01);
(Continued)

(58) Field of Classification Search
CPC ............................ B60L 15/38; B60L 11/1803
(Continued)

(56) References Cited

U.S. PATENT DOCUMENTS

| | | | | |
|---|---|---|---|---|
| 2003/0129457 A1* | 7/2003 | Kawai | ................ | G01R 31/3658 |
| | | | | 429/7 |
| 2007/0247106 A1* | 10/2007 | Kawahara | ............. | B60L 3/0046 |
| | | | | 320/104 |
| 2010/0315043 A1* | 12/2010 | Chau | ..................... | B60L 3/0046 |
| | | | | 320/134 |

FOREIGN PATENT DOCUMENTS

| | | |
|---|---|---|
| DE | 102011011799 A1 | 8/2012 |
| EP | 2404801 A1 | 1/2012 |

* cited by examiner

*Primary Examiner* — Thomas Skibinski
(74) *Attorney, Agent, or Firm* — Blakely Sokoloff Taylor & Zafman LLP

(57) ABSTRACT

The invention relates to a method of controlling the operation of the electrical power supply to an electric motor vehicle comprising at least two energy storage modules connected in parallel, said modules being able to provide the motor with a delivered electrical power lying between a predetermined minimum power and a predetermined maximum power, noteworthy in that the method comprises the following steps: —detection (100, 110) of an operating anomaly of at least one defective module, —reduction (120, 130) of the maximum power that can be provided by the modules, —electrical disconnection (140) of each defective module, the disconnection step being implemented after the reduction of the maximum power.

13 Claims, 4 Drawing Sheets

Figure 1:
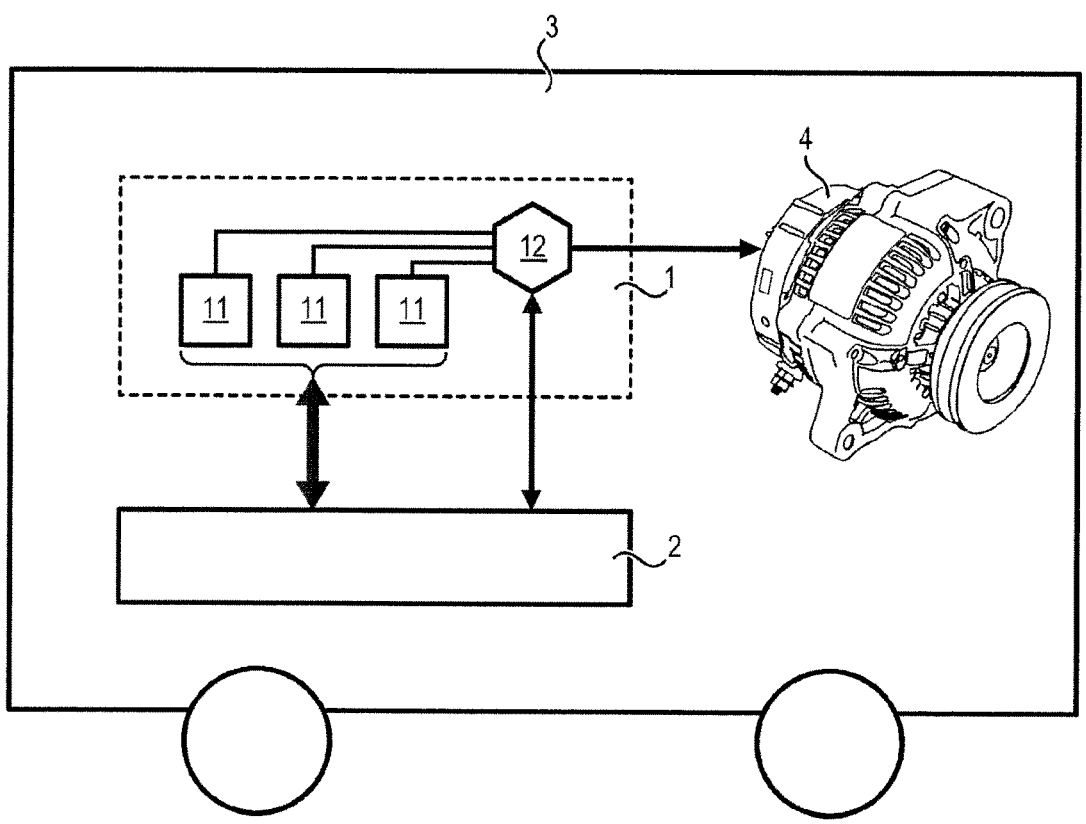

(51) Int. Cl.
*B60L 3/00* (2006.01)
*B60L 3/04* (2006.01)
*B60L 11/18* (2006.01)
*H02J 7/02* (2016.01)
*H02J 7/00* (2006.01)

(52) U.S. Cl.
CPC ....... *B60L 11/1853* (2013.01); *B60L 11/1859* (2013.01); *B60L 11/1862* (2013.01); *B60L 11/1864* (2013.01); *B60L 11/1877* (2013.01); *H02J 7/0063* (2013.01); *H02J 7/027* (2013.01); *B60L 2240/12* (2013.01); *B60L 2240/545* (2013.01); *B60L 2240/547* (2013.01); *B60L 2240/549* (2013.01); *B60L 2250/10* (2013.01); *B60L 2250/16* (2013.01); *H02J 2007/0067* (2013.01); *H02J 2007/0095* (2013.01); *Y02T 10/7005* (2013.01); *Y02T 10/7044* (2013.01); *Y02T 10/7061* (2013.01)

(58) Field of Classification Search
USPC ........ 307/10.1, 9.1, 10.7, 52, 62, 64, 66, 71, 307/80, 85, 86; 320/104, 103, 116, 118, 320/121, 132–136
See application file for complete search history.

METHOD AND DEVICE FOR MANAGING ELECTRICAL ENERGY STORAGE ASSEMBLIES FOR ELECTRICAL POWER SUPPLY OF AN ELECTRIC MOTOR VEHICLE

TECHNICAL FIELD

The present invention relates to the general technical field of electric energy storage assemblies.

More particularly, the invention relates to the field of modules comprising at least two electric energy storage assemblies.

Within the scope of the present invention, by <<electric energy storage assembly>> is meant either a capacitor (i.e. a passive system comprising two electrodes and an insulator), or a supercapacitor (i.e. a system comprising two electrodes, an electrolyte and a separator), or a battery of the lithium battery type (i.e. a system comprising an anode, a cathode and an electrolyte between the anode and the cathode).

GENERAL PRESENTATION OF THE PRIOR ART

Modules are known, also called battery packs, comprising a casing in which are positioned several electric energy storage assemblies, which are elementary battery cells, connected in series with connection means.

These modules also comprise an electronic management card notably for handling the charging and the discharging of the electric energy storage assemblies or safety within the module.

The module may be used for electrically powering an electric motor vehicle such as a bus, a truck or a car. To do this, the vehicle comprises downstream from the batteries, a variable power control unit with which it is possible to vary the power transmitted to the motor depending on external commands, notably from the user.

Each vehicle may comprise a plurality of modules connected in parallel, this being notably valid when the power needs of the vehicle are high.

One of the present difficulties relates to handling the operation of these modules, notably when the characteristics of the modules diverge because of a one-off malfunction or not of one of the battery packs.

An object of the present invention is to propose a method and a system giving the possibility of controlling the operation of the electric energy storage modules of an electric motor vehicle comprising at least two electric energy storage modules connected in parallel.

PRESENTATION OF THE INVENTION

For this purpose, a method for controlling the operation of the electric power supply of an electric motor vehicle is provided, comprising at least two energy storage modules connected in parallel, said modules being able to provide the motor with a delivered electric power comprised between a predetermined minimum power and a predetermined maximum power, remarkable in that the method comprises the following steps:
  detecting an operating anomaly of at least one defective module,
  reducing the maximum power which may be provided by the modules, the maximum power resulting from the reduction step, being strictly greater than zero power, notably than the minimum power,
  electrically disconnecting each defective module, the disconnection step being applied after reducing the maximum power.

Preferably, the vehicle comprises a power controller giving the possibility of controlling the power delivered by the modules according to a command from a user, the maximum power corresponding to a threshold power of the controller, the reduction in the maximum power being carried out by controlling the power controller.

Thus, when the vehicle is operating, this allows disconnection of a defective energy storage module without having to stop the vehicle.

This allows:
  great safety on the one hand, notably by limiting the risks of degradation of the energy storage modules subsequent to a significant exchange of current between the energy storage modules,
  good flexibility in use for the user on the other hand, notably by allowing electric disconnection of an energy storage module without forcing the user to stop the electric vehicle.

By limiting the maximum power granted to the motor before disconnecting the energy storage module it is possible:
  to avoid placing the vehicle in difficulty if the user requires very high power upon disconnection, which would risk generating damages at the disconnection mechanism (power contactors),
  to prevent disconnection of the defective energy storage module from being deferred for too long.

Preferred but non-limiting aspects of the device according to the invention are the following:
  the reduction step may comprise the sub-steps of:
    controlling the reduction in the maximum power which may be provided by the modules, and then
    waiting for a predetermined period of time before applying the disconnection step;
  by controlling the disconnection of the defective module after a predetermined period of time gives the possibility of guaranteeing that the maximum power granted to the motor is actually reduced when the step for disconnecting the module is applied,
  alternatively, the reduction step may comprise the sub-steps of:
    controlling the reduction in the maximum power which may be provided by the modules, and then
    acquiring at least one parameter related to the power of the motor,
    check that said and at least one parameter meets a power reduction criterion:
      if said power reduction criterion is met, then apply the disconnection step,
      otherwise, return to the step for acquiring said and at least one parameter related to the power of the motor;
  the parameter related to the power of the motor may for example be the power of the motor, the speed of motion of the vehicle, the intensity of the current crossing the motor or the variable power control unit, etc.;
  the fact of conditioning the disconnection of the defective module to meeting a criterion gives the possibility of making sure that the maximum power granted to the motor has actually been reduced before applying disconnection of the module, on the one hand, and of limiting the duration between the actual reduction of the maximum power and the disconnection of the defective module on the other hand;

the detection step may comprise, for each module, the following sub-steps:

acquiring at least one parameter representative of features of the relevant module, and for at least one parameter, comparing the value of the parameter with at least one predetermined threshold value in order to identify a possible operating anomaly of the relevant module;

the representative parameter of characteristics of the module may for example be the voltage on the terminals of the module or the electric intensity crossing it, the temperature of the module, etc.

An anomaly may be detected if a parameter exceeds a threshold value or if a particular combination of parameters either exceeding the threshold value or not is obtained;

the method further comprises a step for increasing the maximum power which may be provided by the modules, said increasing step being applied after the disconnection step. This step, like any step for reducing or increasing the power, is notably obtained by controlling the power controller;

this allows the user to use his/her vehicle normally after disconnection of the defective module;

the method further comprises a step for transmitting an alert signal to an audible or visible alarm of the vehicle for informing the user on the anomaly and/or on the disconnection;

this allows the user to be informed on the anomaly so that he/she may take suitable steps for its subsequent possible loss of speed, the reduction step consists of continuously decreasing the maximum power which may be provided by the modules, so that the maximum power variation is gradual, notably linear;

this gives the possibility of avoiding a sudden drop in the displacement speed of the vehicle and therefore limits the risks of accidents, the method further comprises a step for waiting for a predetermined time between the detection step and the reduction step;

this timing gives the possibility of leaving sufficient time to the user for adapting his/her driving to its next possible loss of speed, the method comprises, during at least one starting of the vehicle, a step for pre-charging the power controller, such as a variable power control unit, giving the possibility of controlling the power delivered by the modules depending on a command from a user, said pre-charging step including the electric connection of the power controller to a given module so as to increase the voltage on the terminals of the power controller before its connection to the assembly of modules;

the pre-charging step allows limitation of the risks of degradation of the power controller by increasing the voltage on its terminal to a value close to the voltage on the terminals of the given module;

the pre-charging step comprises a sub-step consisting of selecting a different given module upon each starting of the vehicle;

by using a different module at each starting in order to apply the pre-charging step, it is possible to limit the risks of degradation of a particular module and allow homogenization of the ageing of the different modules;

the pre-charging step comprises, before the sub-step for selecting a different given module, a sub-step consisting of determining a group of defective detected modules during the previous starting of the vehicle, the selection sub-step consisting of selecting a given module from among the modules not belonging to the group of defective detected modules, at least one energy storage module, notably each storage module, comprises a plurality of elementary battery cells connected in series.

The invention also relates to a system for controlling the operation of the electric power supply of an electric motor vehicle comprising at least two energy storage modules connected in parallel, said modules being able to provide to the motor a delivered electric power comprised between a predetermined minimum power and a predetermined maximum power, the system comprising:

means for detecting an operation anomaly of at least one defective module, means for decreasing the maximum power which may be provided by the modules, so that the maximum power remains strictly greater than zero power, means for disconnecting each defective module.

The system according to the invention is programmed so as to apply the steps of the method described earlier notably by means of a processing unit.

The system according to the invention also comprises a power controller allowing control of the power delivered by the modules according to a command from a user, the maximum power corresponding to a threshold power of the controller, the means for decreasing the maximum power comprising means for controlling the power controller.

The invention also relates to a computer program product comprising program code instructions recorded on a medium which may be used in a computer, remarkable in that it comprises instructions for applying the method described earlier.

PRESENTATION OF THE FIGURES

Figure 2:
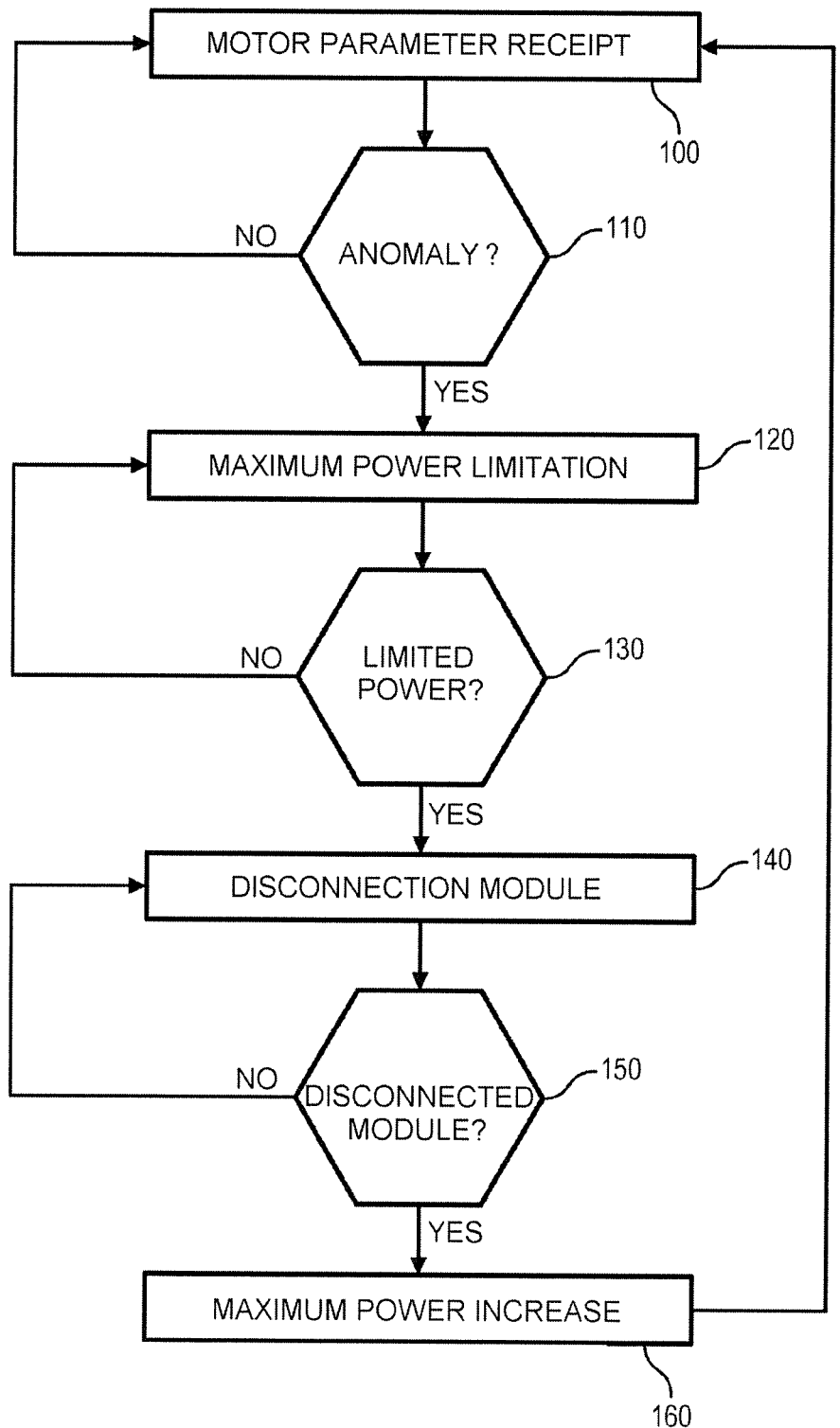
Figure 3:
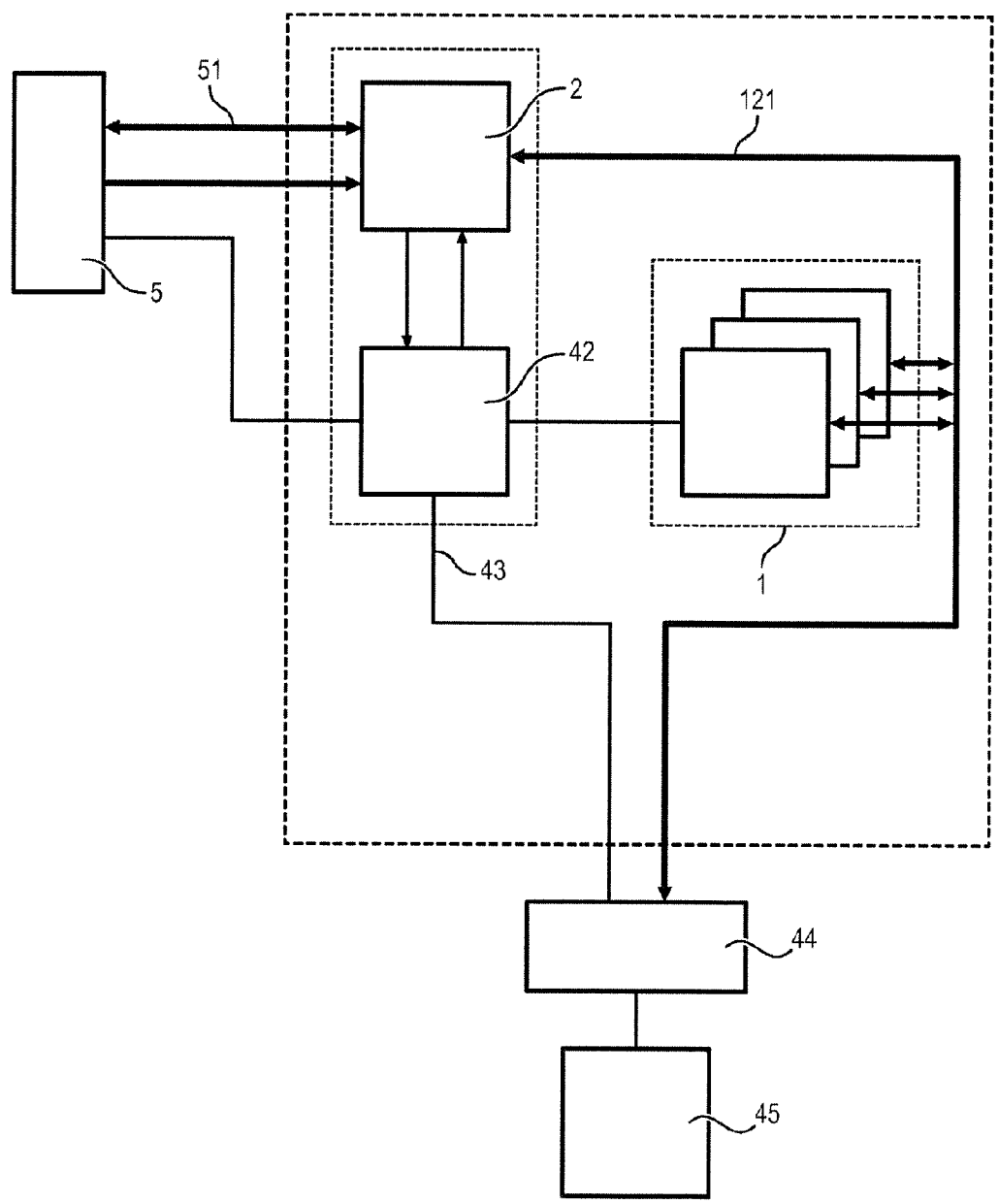
Figure 4:
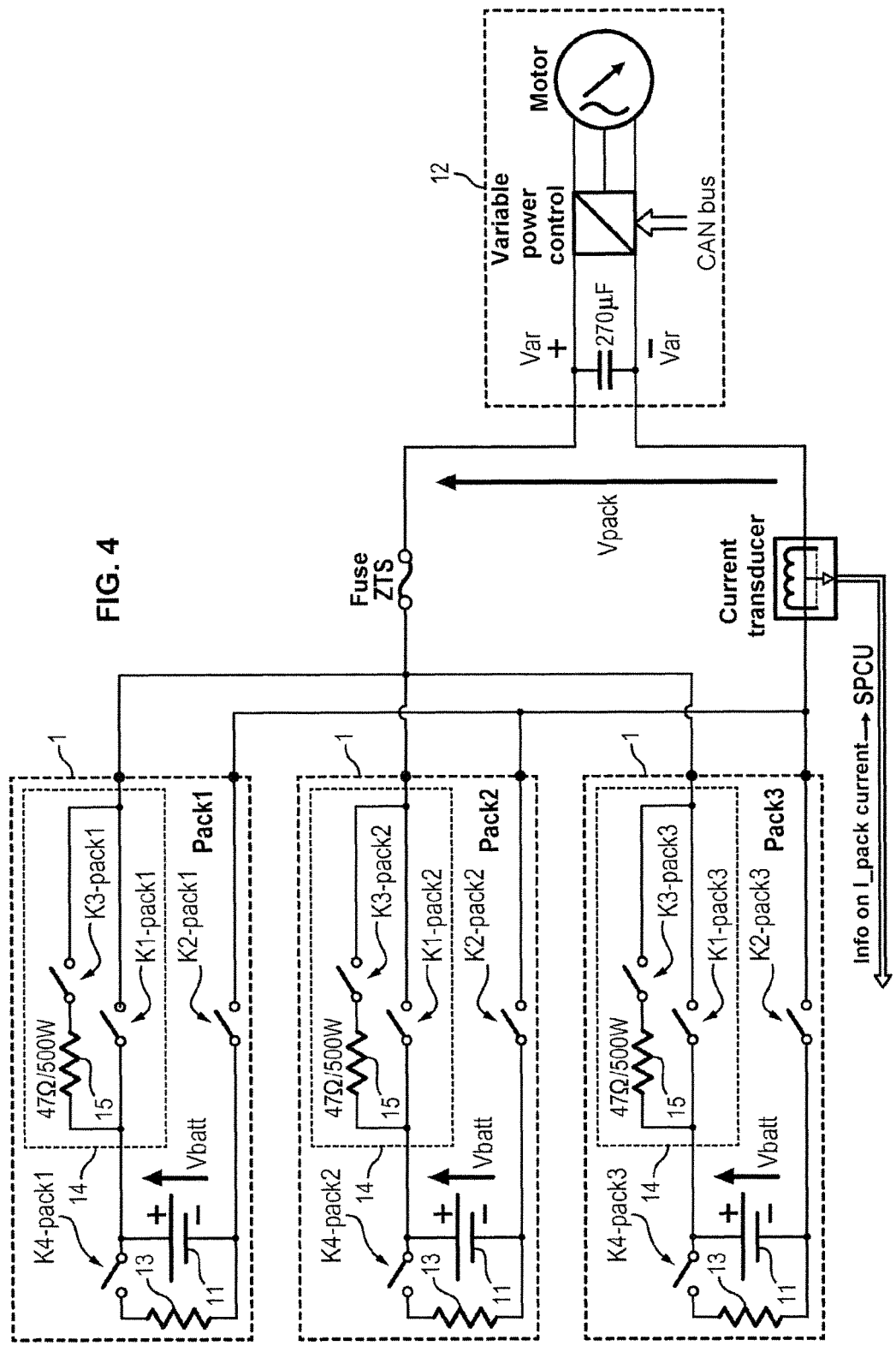

Other features, objects and advantages of the present invention will become further apparent from the description which follows, which is purely illustrative and non-limiting and should be read with reference to the appended drawings wherein:

FIG. 1 schematically illustrates an electric motor vehicle,

FIG. 2 illustrates an exemplary method for controlling the power supply of an electric motor vehicle, FIG. 3 partly illustrates elements making up an electric motor vehicle, FIG. 4 schematically illustrates an electric energy storage unit.

DESCRIPTION OF THE INVENTION

Different embodiments of the module according to the invention will now be described with reference to the figures. In these various figures, equivalent elements bear the same numerical references.

1. General Operating Principle

With reference to FIG. 1, an example of a system 2 for controlling the operation of the electric power supply of a vehicle 3 with an electric motor 4 is illustrated.

The vehicle 3 comprises an electric energy storage unit 1 including:

three electric energy storage modules 11 mounted in parallel, and a power controller 12 mounted in series with the three modules 11, downstream from these three modules.

Each module 11 includes a plurality of electric energy storage assemblies 11—of the battery type—allowing storage of electric energy for subsequently giving it back to the electric motor 4 of the vehicle 3. The power controller is adapted so as to control the power delivered to the electric motor depending on a command from the user, the value of the power delivered by the modules may vary between a predetermined minimum power value (zero power) and a predetermined and adjustable maximum power value.

The vehicle 3 also comprises a processing unit 2 connected to the modules 11. The processing unit 2 for example comprises computer(s), processor(s), micro-controller(s), micro-computer(s), programmable automaton(s), specific application integrated circuit(s) or other devices known to one skilled in the art.

The processing unit 2 gives the possibility of controlling the operation of the electric energy storage unit 1. The processing unit 2 notably allows control of the charging and of the discharging of the modules 11, as well as of the diagnostics of the modules 11. The processing unit also allows control of the power controller. In particular, the processing unit is able to configure the power controller, notably by varying the value of the threshold power of the controller, i.e. the maximum power which may be provided by the modules 11, and therefore the maximum power which may be required by the electric motor 4. Communication of the processing unit with the modules 11 is direct while communication with the power controller is indirect, via a supervisor, as this will be seen later on.

The processing unit 2 is programmed so as to apply the method illustrated in FIG. 2. The operation principle of the processing unit 2 is the following.

During the operation of the electric vehicle 3, the processing unit 2 monitors (steps 100, 110) possible anomalies of the modules 11. This phase for monitoring the occurrence of possible anomalies will be described in more detail subsequently with reference to FIG. 3.

When the processing unit does not detect any anomaly, the maximum power which may be delivered by the modules 11 is equal to an initial value.

When the processing unit 2 detects an anomaly on a module 11, the processing unit 2 orders the power controller 12 to limit the maximum power which may be delivered by the modules 11 (steps 120, 130). More specifically, the processing unit 2 replaces the initial value of the maximum power with a limited value of less than the initial value while being different from zero power, which has an influence on the maximum speed of the vehicle.

Once the value of the maximum power has been reduced, the processing unit 2 orders disconnection of the defective module 11 (step 140). By limiting the power granted to the motor before disconnecting the defective module 11, it is possible:
- to avoid risks of degradation of the other modules 11, notably in the case of significant exchange of electric current between the modules 11 upon disconnecting the defective module 11,
- to not place the vehicle in difficulty, notably if the user requires very high power from the modules 11 upon disconnection, which would risk generating damage at the disconnection mechanism (controlled switches, etc.), and
- to limit the duration between the detection of a failure on a module 11 and the disconnection of the defective module 11.

Thus, the processing unit 2 described above allows disconnection of a defective module 11 without requiring stopping of the vehicle 3.

Disconnection of the defective module 11 (i.e. passing from the step for reducing the maximum power to the step for disconnecting the module) may occur when a disconnection criterion is met.

For example in an embodiment, the processing unit 2 comprises a sensor with which one or several parameters—called <<operating parameters>>—related to the power of the motor 4 may be measured. This measurement allows detection of a reduction in the maximum power granted to the motor 4. When the value(s) of this(these) operating parameter(s) inform(s) the processing unit 2 that the maximum power provided by the modules 11 has been reduced, the processing unit 2 applies disconnection of the defective module 11 (step 140). This gives the possibility of guaranteeing that the reduction in the maximum power granted to the motor is effective before disconnecting the module 11.

Alternatively, the disconnection of the defective module 1 may be controlled following a predetermined period of time.

For example in an embodiment, the disconnection of the defective module 11 by the processing unit 2 is applied after a predetermined period of time starting with detection of the anomaly. This gives the possibility of guaranteeing that the disconnection of the module 11 is carried out after reduction of the maximum power on the one hand and limitation of the number of sensors used by the processing unit 2 on the other hand.

After electric disconnection of the defective module 11, the processing unit 2 may be programmed in order to re-establish the initial value of the maximum power allocated to the motor 4 (step 160). More specifically, after disconnection of the defective module, the processing unit 2 replaces the limited value of the maximum power granted to the motor 4 (threshold power of the power controller) with the initial power value. The user may then normally use his/her vehicle 3 following disconnection.

This alternative embodiment is notably achieved when the vehicle comprises at least three electric energy storage modules 1 connected in parallel.

In an exemplary embodiment, the processing unit 2 may replace the first limited maximum power value with a second limited maximum power value:
- greater than the limited power value and
- less than or equal to the initial value.

Optionally, the processing unit 2 may inform the user on the detection of an anomaly on one of the modules 11. In order to inform the user, the processing unit 2 may transmit information on display means or on means for emitting audible signals.

The processing unit 2 may also transmit a message to the user, informing him on the detected problem and the actions which will have to be conducted in order to solve this problem. The message may be transmitted via the dashboard of the vehicle (onboard computer, indicator . . . ) in a visible and/or audible form.

Advantageously, the disconnection of the defective module 11 by the processing unit 2 may be applied after a given period of time starting with the transmission of the message to the user. This allows the user to take suitable steps with view to his/her subsequent possible loss of speed.

2. Anomaly Detection Phase

With reference to FIG. 3, certain elements of an electric motor vehicle have been illustrated in a functional way.

The vehicle includes a supervisor 5, a processing unit 2 and an electric energy storage unit 1.

The supervisor 5 allows control of the processing unit 2 which carries out management of the energy storage unit 1 and communicates with the various units of the vehicle, such as for example the electric motor, the dashboard and the power controller 12 via at least one communications bus. In other words, the supervisor supervises and communicates with all the units of the vehicle, except for the energy storage modules 1, directly controlled by the processing unit 2.

The storage unit 1 notably includes three modules 11 mounted in parallel. The modules 11 allow storage of electric energy. They are connected to the electric motor 4 via a power link 41 and a technical interconnection area 42. The modules 11 are further connected via a power link 43 to an electric connector 44. This electric connector 44 is intended to be connected to an external charger 45 in order to allow supply of electric power to the modules 11. The modules 11 are also connected to the processing unit 2.

The processing unit 2 is connected:
- to the supervisor 5 via a first communications bus 51 such as a <<controller area network>> bus (or CAN bus).
- to the modules 11 via a second communications bus 121.

The processing unit 2 is adapted so as to detect one or several anomalies occurring on one or several modules 11.

More specifically, the processing unit 2 is able to:
- obtain information on each of the modules 11 and on other elements of the vehicle via the supervisor and the first communication bus CAN, and
- emit commands depending on this information:
  - towards the storage unit 1 in order to reduce the maximum power granted to the motor 4, disconnecting a defective module 11, etc., and
  - towards the vehicle 3 for warning the user of a failure of a defective module 11, etc.

The operating parameter(s) depending on which the processing unit 2 is able to detect one or several anomalies, may be comprised in the following list:
- the voltage on the terminals of the modules 11,
- the intensity crossing the modules 11,
- the temperature of the modules 11,
- the characteristic of the signals reaching the supervisor 5 (for example an emergency stop request),
- the electric characteristics of at least one component of the modules 11.

The disconnection parameter(s) depending on which the processing unit 2 is able to trigger disconnection of the defective module(s) 11, may be comprised in the following list:
- power of the motor 4,
- speed of the vehicle 3,
- current crossing an electric unit, notably the power controller 12, etc.

The operating principle of the processing unit 2 is the following.

During the use of the vehicle, the processing unit 2 carries out monitoring of the operating condition of the modules 11.

Notably, the processing unit 2 acquires operating parameter(s), for example measured in situ in the modules 11 with suitable sensors such as voltage, current, temperature sensors, etc., via the first communications bus CAN 51 and/or the second communications bus 121. Each acquired operating parameter is compared with a threshold value by the processing unit 2.

If the result of the comparison meets a normal operating criterion, then none of the modules 11 is defective. For example, if the temperature of the modules 11 is less than a predetermined limiting temperature stored in memory, then the modules 11 are in a normal operating state. The processing unit 2 continues the acquisition and comparison of the operating parameter(s) with the threshold value(s).

When the result of the comparison does not meet the normal operating criterion, then one of the modules 11 is defective. For example, if the temperature of a module 11 exceeds the predetermined limiting temperature stored in memory, then this module 11 is defective.

The processing unit 2 transmits to the supervisor 5 via the first communications bus, an information signal in order to possibly warn the user about the malfunction. The processing unit 2 transmits to the power controller 12 via the first communications bus 51, a control signal for reducing the maximum power delivered by the modules.

The processing unit 2 checks whether the reduction in the maximum power granted to the motor is effective or not. To do this, the processing unit 2 acquires disconnection parameter(s). Each acquired disconnection parameter is compared with a threshold value in order to check whether a criterion relating to the reduction in the maximum power granted to the motor is met. For example, the processing unit 2 acquires the displacement speed of the vehicle, a current or a power of the motor, and compares it with a set value.

If this criterion is not met, the processing unit 2 does not order disconnection of the defective module and again begins acquisition of disconnection parameter(s), after a time-out period.

If this criterion is met, the processing unit 2 orders disconnection of the defective module. More specifically, the processing unit 2 transmits to the storage unit 1 via the second communications bus 121, a disconnection signal for disconnecting the defective module 11.

Once the defective module 11 is disconnected, the processing unit 2 may order an increase in the maximum power delivered by the modules 11. More specifically, the processing unit 2 transmits to the power controller 12 via the first communications bus 51 and the supervisor, a control signal for increasing the value of the maximum power granted to the motor (threshold power of the controller).

3. Phase for Disconnecting a Defective Module

With reference to FIG. 4, an example of an electric energy storage unit 1 is illustrated in more detail. This electric energy storage unit 1 comprises three modules 11 connected in parallel and a power controller 12.

Each module 11 comprises a plurality of electric energy storage assemblies (not shown) connected with each other in series. Each module 11 is associated with:
- a control switch K2 connected to the positive terminal of the module,
- a heating unit branched in parallel on module 11, the heating unit including an electric heating resistor 13 mounted in series with a control switch K4,
- a pre-charging circuit 14 connected to the positive terminal of the module, the pre-charging circuit 14 including:
  - a pre-charging unit consisting of a pre-charging electric resistor 15 connected in series with a control switch K3, and
  - a control switch K1 mounted in parallel on the pre-charging unit 14.

The three modules 11 mounted in parallel are also electrically connected to the power controller 12.

The power controller 12 gives the possibility of varying the power sent to the motor between zero power and a maximum power. This power sent to the motor depends on the power required by the user (for example by pressing on an accelerator pedal of the vehicle).

In the embodiment illustrated in FIG. 4, the power controller 12 comprises a capacitor mounted in parallel on a variable power control. The capacitor allows filtering of the signals sent to the variable power control. The variable power control gives the possibility of varying the power sent to the motor depending on the use of the vehicle.

The processing unit 2 is connected to the power controller 12 via the first communications bus 51. This allows the processing unit to decrease/increase the value of the maximum power defined in the power controller.

In an embodiment, the processing unit 2 is adapted for decreasing (respectively increasing) linearly the value of the maximum power defined in the power controller. To do this, the processing unit transmits to the power controller via the first communications network a plurality of intermediate signals corresponding to intermediate maximum power values. The values of the successive intermediate signals are:
  decreasing values in the case of gradual reduction in the maximum power which may be granted to the motor, or
  increasing values in the case of an increase in the maximum power which may be granted to the motor.

The principle for connecting/disconnecting the modules will now be described in more detail.

Controlling Starting Permission

Before any connection of the modules 11 to the motor, the processing unit checks that there is no divergence between the voltages of the different modules 11. If the voltage difference between the different modules is part of an authorized range of values, the processing unit and/or the supervisor allows starting of the vehicle. In the opposite case, starting of the vehicle is not allowed and the processing unit tells the user via the supervisor that the charging of the vehicle should resume.

Pre-Charging Phase

Once starting of the vehicle is permitted and before connecting the various modules 11, a pre-charging phase is applied during which:
  for a given module, the switches (i.e. power contractors) K3 and K2 are closed and the switch K1 is open,
  for the other modules, the switches K1, K2, and K3 are open.

The processing unit measures the voltage Vbatt on the terminals of the given module, and the voltage Vpack on the terminals of the power controller. When certain criteria are met (for example, Vpack>95% of Vbatt, and Ipack<2A), pre-charging is considered to be finished. This pre-charging step gives the possibility of raising the voltage on the terminals of the filtering capacitor (and of the variable power control), to the same level as that of the given module for avoiding strong and destructive currents upon connecting the other modules.

A single one of the modules may include the pre-charging circuit 14, and be used for applying this pre-charging phase at each start of the vehicle. However, in order to preserve the modules during this pre-charging phase, the latter are used alternately at each starting of the vehicle, depending on orders given by the processing unit. This allows operation of the energy storage unit even when a module is disconnected.

Connection of the Modules

Once the pre-charging phase is completed, the processing unit orders connection of the modules to the power controller. The module having been used during the pre-charging phase is connected the first. In order to connect this module, its associated switch K1 is closed and its associated switch K3 is open (K2 remains closed). Next, connection of the other modules (after a time out period) is carried out by closing the switches K2 and then K1 for each of these modules successively.

In the case of a processing unit comprising three modules, the state of the control switches are the following during the connection phase:
  initial conditions:
    pre-charging is effective, no "Divergence Tension Pack" alarm (alarm relating to the voltage difference between the modules)
  connection of the first module:
    the control switch K1_pack1 is closed, K2_pack1 remains closed,
    the control switch K3_pack1 is open (the first module is connected);
  a time-out is initiated by the processing unit, once the time-out period has elapsed, it is proceeded with the next step,
  connecting the next module:
    the control switch K2_pack2 is closed, and then
    the control switch K1_pack2 is closed (the second module is connected),
  a time-out is initiated by the processing unit; once the time-out period has elapsed, it is proceeded with the next step:
  connecting the third module:
    the control switch K2_pack3 is closed, and then
    the control switch K1_pack3 is closed (the third module is connected).

It will be noted that the connection is of course carried out following a request to run from the vehicle.

Running Phase

Once the three modules are connected, the vehicle is in the running phase. The processing unit measures parameter(s) relating to the different modules, such as for example:
  the electric voltage on the terminals of each module,
  the temperature of each module,
  the electric current of each module, etc.

These values are compared with prerecorded threshold values.

When the comparison operation indicates that the measured values are normal, the three modules remain connected to the power controller.

However, when the measured values are not normal for one of the modules, the processing unit states that the module is defective. In this case, the processing unit triggers the steps for limiting maximum power and for disconnecting the defective module as illustrated in FIG. 2.

In a first phase, the processing unit 2 alerts the user on the detection of an anomaly. To do this, the processing unit 2 sends a message to the supervisor 5 which relays the information over the first communications bus 51 of the vehicle in order to inform the user by means of an indicator located on the dashboard of the vehicle for example and/or of an audible alarm.

Once the alert has completed, the processing unit 2 initiates a timer (or time counter) for a few seconds (for example 1 minute) in order to leave time to the user for placing himself/herself on the roadside or in a suitable location (on the right lane if he/she is on a motorway, etc.).

When the time interval measured by the timer has elapsed, the processing unit orders the power controller to reduce the value of the maximum power which may be granted to the motor (threshold power of the power controller). Thus, the power requested by the user is gradually reduced and no longer depends on the actions of the user when the latter requests a greater power than the maximum power.

The processing unit also measures the value of a disconnection parameter related to the power required by the motor (such as the speed of the vehicle or the intensity of the variable power control or of the motor, for example). Once the value of the disconnection parameter is less than a set value, the processing unit—which obtains this piece of information from the first communications bus of the vehicle (speed of the vehicle for example) or from measurement sensors of the electric energy storage unit—orders disconnection of the defective module.

To do this, the processing unit orders the opening of the switches K1 and K2 of the defective module. There is no additional checking to be made, since, because of the reduction of the maximum power which may be granted to the motor, the electric current Ipack crossing the power controller is less than the threshold value which allows disconnection of the defective module without any problems.

Once the defective module is disconnected, the processing unit orders the opening of the switch K4, which corresponds to a secured state since all the controlled switches of the defective module are open. This configuration is not compliant with the standard stopping configuration during which K4 remains closed in order to keep the module at a suitable temperature.

Once this step is completed, the processing unit informs the driver via the supervisor by communicating with the first communications bus of the vehicle and re-establishes normal operation of the power controller by gradually increasing the maximum power granted by the modules.

Advantageously, the processing unit may store in memory information on the defective module. This gives the possibility of avoiding re-connection of the defective module to the vehicle upon a subsequent switching on of the latter.

In an embodiment, the processing unit may be programmed for determining an anomaly category of the defective module. Notably, the processing unit may be programmed in order to determine whether the anomaly of the defective module is:
- a resorbable anomaly, such as for example in the case of insufficient charging of the module, or
- a non-resorbable anomaly, such as for example the degradation of a component making up the defective module.

Depending on the category of the anomaly, the processing unit may be programmed in order to carry out various actions. For example:
- in the case of a resorbable anomaly, the processing unit may be programmed for determining whether the defective module may be reconnected to the vehicle during subsequent starting of the latter,
- in the case of a non-resorbable anomaly, the processing unit may be programmed for transmitting on the first communications bus CAN of the vehicle, information intended for the user and informing him/her of the requirement of sending back the vehicle to maintenance.

One skilled in the art will have understood that many modifications may be brought to the method and to the system described earlier without materially leaving the novel teachings and advantages described herein.

For example, the processing unit may be integrated or separated from the electric energy storage unit. Also, this processing unit may be integrated or separated from the supervisor. On the other hand, certain functions achieved by the processing unit may be applied in the power controller.

The invention claimed is:

1. A method for controlling the operation of the electric power supply of an electric motor vehicle, said electric motor vehicle comprising:
   at least two energy storage modules connected in parallel, said modules being able to provide the motor with delivered electric power comprised between a predetermined minimum power and a predetermined maximum power,
   a power controller allowing control of the power delivered by the modules depending on the power required by a user of the vehicle, the maximum power corresponding to a threshold power of the controller,
   this power controller comprising a capacitor mounted in parallel to a variable power control for varying the power sent to the electric motor, and
   a processing unit for realizing the diagnostics of the energy storage modules and controlling the power controller,
   the method comprising:
   detecting an operation anomaly of at least one defective module, by said processing unit, wherein the method comprises the following steps realized after the anomaly detecting step:
      controlling the processing unit in such a way that said processing unit controls the power controller to reduce the maximum power provided by the modules to the electric motor, while keeping said maximum power strictly greater than zero power,
      electrically disconnecting each defective module, after reduction of the maximum power realized by the power controller.

2. The control method according to claim 1, wherein the reduction of the maximum power comprises sub-steps for:
   controlling the reduction in the maximum power which may be provided by the modules, and then
   waiting for a predetermined period of time before applying the electrically disconnecting.

3. The control method according to claim 1, wherein the reduction of the maximum power comprises sub-steps for:
   controlling the reduction in the maximum power provided by the modules, and then
   acquiring at least one parameter related to the power of the motor,
   checking that said and at least one parameter meets a power reduction criterion:
      if said power reduction criterion is met, then applying the electrically disconnecting,
      otherwise, returning to the step for acquiring said and at least one parameter related to the power of the motor.

4. The control method according to claim 1, wherein the detecting comprises, for each module, the following sub-steps for:
   acquiring at least one parameter representative of characteristics of the relevant module, and
   for at least one parameter, comparing the value of the parameter with at least one predetermined threshold value in order to identify a possible operating anomaly of the relevant module.

5. The control method according to claim 1, which further comprises a step wherein the processing unit controls the power controller for increasing the maximum power which may be provided by the modules, said increasing being applied after the electrically disconnecting.

6. The control method according to claim 1, which further comprises a step for transmitting an alert signal to an audible or visible alarm of the vehicle for informing the user on the anomaly and/or on the disconnection.

7. The control method according to claim 1, wherein the reduction of the maximum power includes continuously decreasing the maximum power provided by the modules, so that the maximum power variation is gradual.

8. The control method according to claim 1, which further comprises a step for waiting for a predetermined period between the detecting and the reduction of maximum power.

9. The control method according to claim 1, further comprising, during at least one starting of the vehicle, a step for pre-charging the power controller, said pre-charging step including the electric connection of the power controller to a given module so as to increase the voltage on the terminals of the power controller before its connection to the assembly of modules.

10. The control method according to claim 9, wherein the pre-charging step comprises a sub-step including selecting a different given module at each starting of the vehicle.

11. The control method according to claim 10, wherein the pre-charging step comprises, prior to the sub-step for selecting a different given module, a sub-step including determining a group of defective detected modules during the previous starting of the vehicle, the selection sub-step consisting of selecting a given module from among the modules not belonging to the group of defective detected modules.

12. The control method according to claim 1, wherein at least one energy storage module comprises a plurality of elementary battery cells connected in series.

13. A system for controlling the operation of the electric power supply of a vehicle with an electric motor comprising at least two energy storage modules connected in parallel, said modules being able to provide the motor with a delivered electric power comprised between a predetermined minimum power and a predetermined maximum power, the system comprising:
  a processing unit for detecting an operating anomaly of at least one defective module and disconnecting each defective module,
  wherein the system comprises:
  a power controller allowing control of the power delivered by the modules according to the power required by a user of the vehicle, the maximum power corresponding to a threshold power of the controller, the power controller comprising a capacitor mounted in parallel to a variable power control for varying the power sent to the electric motor,
  and wherein the process unit allows control of the power controller for reducing the maximum power provided by the modules to the electric motor, while keeping the maximum power strictly greater than zero power, and electrically disconnecting each defective module, after reduction of the maximum power realized by the power controller.

* * * * *